(12) United States Patent
Lam

(10) Patent No.: US 11,280,617 B2
(45) Date of Patent: Mar. 22, 2022

(54) HIGH PERFORMANCE DUAL MODE MIXING INERTIAL NAVIGATION SYSTEM

(71) Applicant: BAE SYSTEMS Information and Electronic Systems Integration Inc., Nashua, NH (US)

(72) Inventor: Quang M. Lam, Fairfax, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 227 days.

(21) Appl. No.: 16/550,407

(22) Filed: Aug. 26, 2019

(65) Prior Publication Data
US 2021/0063160 A1    Mar. 4, 2021

(51) Int. Cl.
*G01C 21/16*    (2006.01)
(52) U.S. Cl.
CPC .................... *G01C 21/165* (2013.01)
(58) Field of Classification Search
CPC .................................................. G01C 21/165
See application file for complete search history.

(56) References Cited

U.S. PATENT DOCUMENTS

| | | | |
|---|---|---|---|
| 10,274,318 B1* | 4/2019 | Sohn | G01C 21/08 |
| 2017/0227363 A1* | 8/2017 | Yuan | G01C 21/206 |
| 2018/0031387 A1* | 2/2018 | Scherer | G01C 5/06 |

* cited by examiner

*Primary Examiner* — Manuel L Barbee
(74) *Attorney, Agent, or Firm* — KPIP Law, PLLC; Gary McFaline

(57) ABSTRACT

The dual mode INS high performance system using an IMM mixing method presented in this disclosure utilizes a MEMS-based IMU as the inertial sensor due, in part, to low cost and low power consumption. A dual filtering system, one with fifteen state EKF and the other with twenty one state EKF is mixed in real-time to address dynamic overlapping and continuous transition from a low dynamic mode to a high dynamic mode. The IMM estimation scheme is employed to compute the real-time mixing coefficients via the IMM probability mixing formulation. The present disclosure is applicable to earth to orbit platforms, spinning projectiles, and the like to successfully reconstruct the object's state estimate vector even under a high angular rate and high g operating environment.

18 Claims, 14 Drawing Sheets

FIG. 1A $$\tilde{\boldsymbol{\omega}} = (I_{3\times 3} + S)\boldsymbol{\omega} + \mathbf{b} + \boldsymbol{\eta}_v$$

$$\dot{\mathbf{b}} = \boldsymbol{\eta}_u$$

$$\dot{\mathbf{s}} = \boldsymbol{\eta}_s$$

$$\dot{\mathbf{k}}_U = \boldsymbol{\eta}_U$$

$$\dot{\mathbf{k}}_L = \boldsymbol{\eta}_L$$

$$E\{\boldsymbol{\eta}_v(t)\boldsymbol{\eta}_v^T(\tau)\} = \sigma_v^2 \delta(t-\tau) I_{3\times 3}$$
$$E\{\boldsymbol{\eta}_u(t)\boldsymbol{\eta}_u^T(\tau)\} = \sigma_u^2 \delta(t-\tau) I_{3\times 3}$$
$$E\{\boldsymbol{\eta}_s(t)\boldsymbol{\eta}_s^T(\tau)\} = \sigma_s^2 \delta(t-\tau) I_{3\times 3}$$
$$E\{\boldsymbol{\eta}_U(t)\boldsymbol{\eta}_U^T(\tau)\} = \sigma_U^2 \delta(t-\tau) I_{3\times 3}$$
$$E\{\boldsymbol{\eta}_L(t)\boldsymbol{\eta}_L^T(\tau)\} = \sigma_L^2 \delta(t-\tau) I_{3\times 3}$$

$$S \equiv \begin{bmatrix} s_1 & k_{U1} & k_{U2} \\ k_{L1} & s_2 & k_{U3} \\ k_{L2} & k_{L3} & s_3 \end{bmatrix}$$

FIG. 1B $$f_m = (I_{3\times3} + S_a)f + b_a + \mu_a$$

$$\dot{b}_a = \mu_u$$
$$\dot{S}_a = \mu_s$$
$$\dot{k}_{aU} = \mu_{aU}$$
$$\dot{k}_{aL} = \mu_{aL}$$

$$S_a = \begin{bmatrix} s_{a1} & k_{au1} & k_{au2} \\ k_{al1} & a_{a2} & k_{au3} \\ k_{al2} & k_{al3} & s_{a3} \end{bmatrix}$$

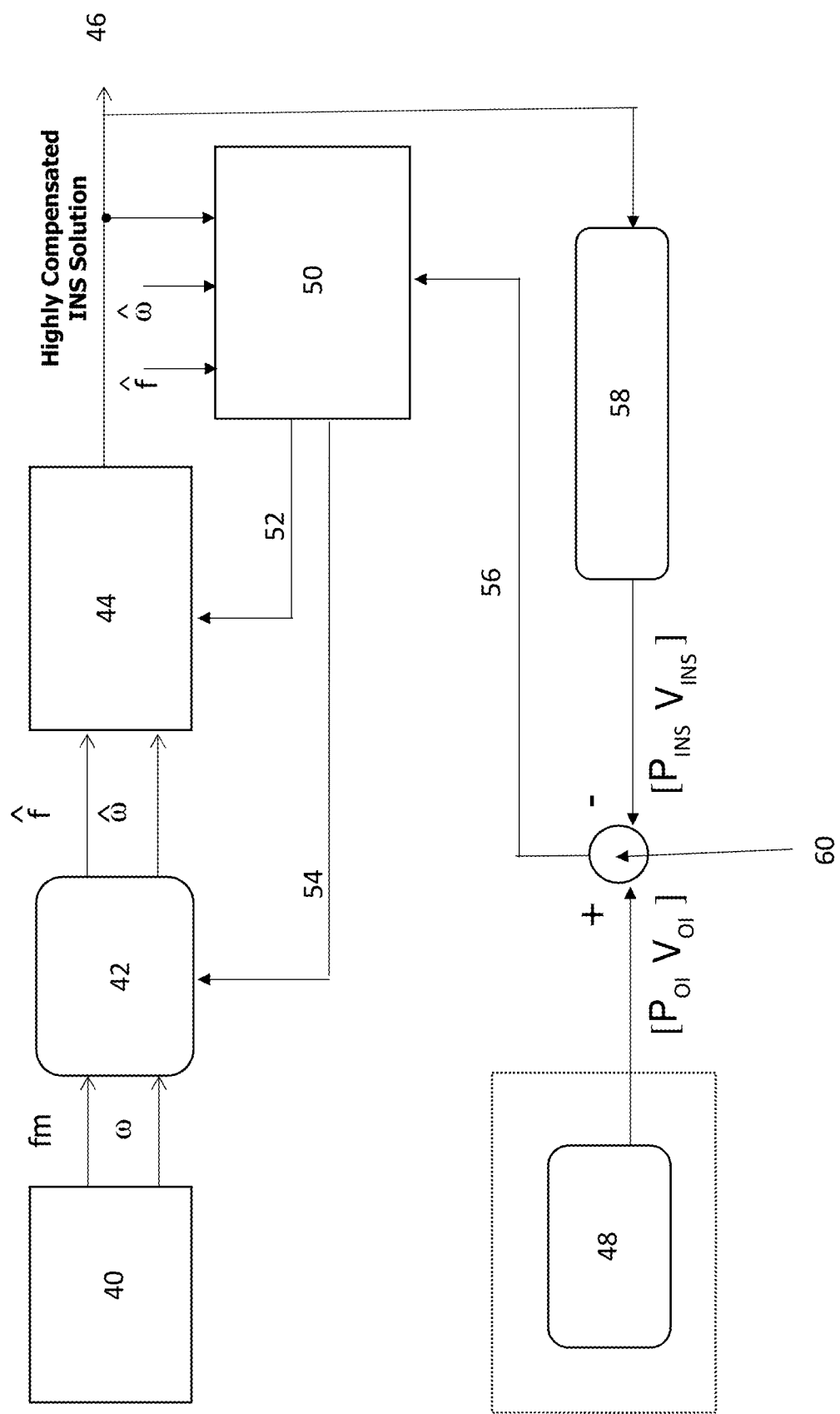

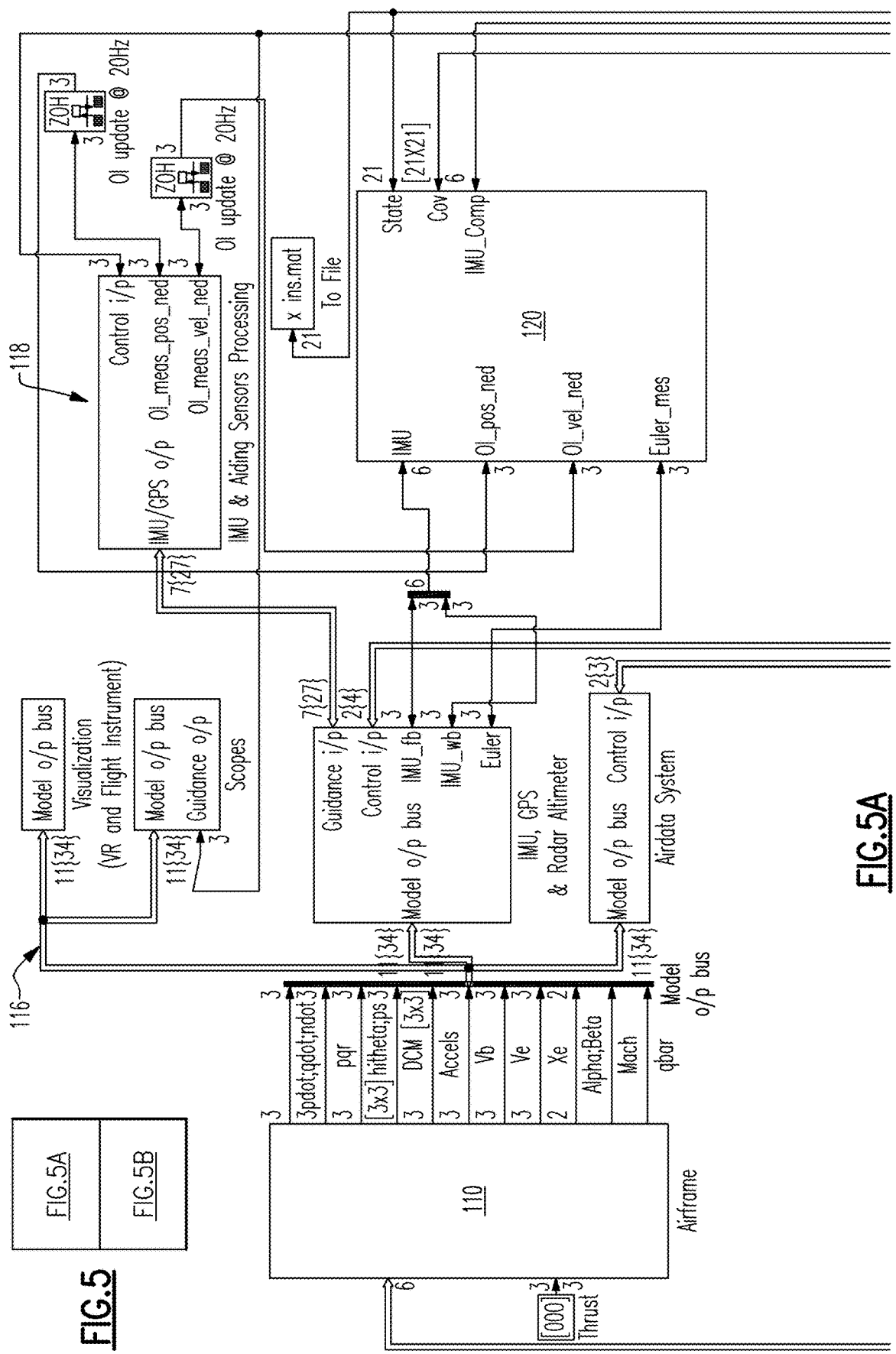

HIGH PERFORMANCE DUAL MODE MIXING INERTIAL NAVIGATION SYSTEM

FIELD OF THE DISCLOSURE

The present disclosure relates to inertial navigation systems and more particularly to a high performance dual mode mixing process useful in handling the error present in low quality MEMS inertial measurement unit sensors.

BACKGROUND OF THE DISCLOSURE

Over the last few decades, Inertial Navigation System (INS) solutions (e.g., position, velocity, and orientation/attitude) have moved toward the use of strap down Micro-Electro-Mechanical Systems (MEMS) Inertial Measurement Unit (IMU). MEMS is a technology that in its most general form can be defined as miniaturized mechanical and electromechanical elements (i.e., devices and structures) that are made using the techniques of microfabrication. MEMS IMUs are widely used in a variety of applications ranging from small satellites, onboard projectiles, and in iPhone personal navigation and information displays. The MEMS IMUs are useful thanks, in part, to an extremely low per unit cost (i.e., <$10 for individual accelerometer and gyroscope), low power consumption, and small space constraints for their implementation.

MEMS IMU output data (i.e., specific force and angular rate) suffer from well-known high bias drift and large scale factor errors, and a typical double integration from specific acceleration ($m/s^2$ but less gravitational) and single integration from angular body rate (rad/s) will not produce an acceptable INS solution for many applications. For example, most of us are familiar with examples our phones or cars that having locations errors around 20 or 30 feet. As a result, external aiding sensors/sources like GPS, radio frequency, or altimeter are used to aid the MEMS IMU in order to produce a high data rate at an acceptable INS solution precision. It is understood that there is a need to remove or reduce high bias drift and scale factor errors in many INS applications if using MEMS IMU as an inertial sensor.

Wherefore it is an object of the present disclosure to overcome the above-mentioned shortcomings and drawbacks associated with using low quality MEMS inertial measurement unit sensors while still providing high performance inertial navigation systems solutions for multiple applications.

SUMMARY OF THE DISCLOSURE

One aspect of the present disclosure is a method of producing a high performance inertial navigation solution using a MEMS based inertial measuring unit, comprising: providing an inertial measuring unit, wherein the inertial measuring unit provides a platform's specific force and angular rate measurements; providing one or more external aiding sensors, wherein the one or more external aiding sensors provide information to aid in an estimate of the error sources for a subsequent calibration and removal of the errors at the inertial measuring unit measurement level; calculating a state and a covariance for a plurality of extended Kalman filter (EKF) models, wherein a first EKF model is a fifteen state and a second EKF model is a twenty one state; updating over time the state and the covariance for the first and the second EKF models, respectively; and estimating and removing high bias drift errors and scale factor errors from the inertial measuring unit data; thereby providing a robust and high precision navigation solution for a variety of aerospace platforms and/or projectiles.

One embodiment of the method of a dual mode high performance inertial navigation solution using a MEMS based inertial measuring unit is wherein mixing is done in real time using an interacting multiple model (IMM) estimation and processing scheme.

Another embodiment of the method of a dual mode high performance inertial navigation solution using a MEMS based inertial measuring unit is wherein mixing is based on mixing coefficients calculated using an interacting multiple model mixing scheme. In some cases, the interacting multiple model mixing scheme captures the continuous dynamic mode transition from a nominal to a high dynamic operating condition.

Yet another embodiment of the method of a dual mode high performance inertial navigation solution using a MEMS based inertial measuring unit is wherein one of the one or more external aiding sensors is a radio frequency OI-enabled sensor.

In certain embodiments of the method of a dual mode high performance inertial navigation solution using a MEMS based inertial measuring unit, the inertial measuring unit and the one or more external aiding sensors are co-located on a vehicle or a projectile.

In certain embodiments, the fifteen state extended Kalman filter is used for a low dynamic mode operating condition using bias errors for the inertial measuring unit and platform state error estimations for position, velocity, and attitude.

In still yet another embodiment, the twenty one state extended Kalman filter is used for a high dynamic mode operating condition using bias errors and scale factor errors for the inertial measuring unit and platform state error estimations for position, velocity, and attitude.

Another attractive aspect of the disclosure is the ease of multiple external aiding mixing mechanism using the multiple model estimation scheme wherein each external aiding sensor can be assigned to each individual Extended Kalman Filter (EKF), and the multiple external aiding sources are then processed using the interacting multiple model (IMM) algorithm at the individual EKF state level.

Yet another aspect of the present disclosure is an inertial navigation system, comprising: an inertial measurement unit (IMU) wherein the inertial measuring unit provides a platform's specific force and angular rate measurements; one or more sensors configured to provide information to aid in an estimate of the error sources for a subsequent calibration and removal of the errors at the inertial measuring unit measurement level; and a processor, the processor configured to: calculate a state and a covariance for a plurality of extended Kalman filter (EKF) models, wherein a first EKF model is a fifteen state and a second EKF model is a twenty one state; update, over time, the state and the covariance for the first and the second EKF models, respectively; estimate and remove high bias drift errors and scale factor errors from the inertial measuring unit data; and provide a robust and high precision navigation solution for a variety of platforms.

One embodiment for the system is wherein mixing is done in real time using an interacting multiple model (IMM) estimation and processing scheme. In some cases, mixing is based on mixing coefficients calculated using an interacting multiple model mixing scheme. In certain embodiments, the interacting multiple model mixing scheme captures the continuous dynamic mode transition from a nominal to a high dynamic operating condition.

Another embodiment of the system is wherein one of the one or more external aiding sensors is a radio frequency OI-enabled sensor.

Yet another embodiment is wherein the inertial measuring unit and the one or more external aiding sensors are co-located on a vehicle or a projectile. In some cases, the fifteen state extended Kalman filter is used for a low dynamic mode operating condition using bias errors for the inertial measuring unit and platform state error estimations for position, velocity, and attitude. In certain cases, the twenty one state extended Kalman filter is used for a high dynamic mode operating condition using bias errors and scale factor errors for the inertial measuring unit and platform state error estimations for position, velocity, and attitude.

Still yet another embodiment of the system is wherein multiple external aiding sensor data is mixed using a multiple model estimation scheme wherein each external aiding sensor can be assigned to each individual Extended Kalman Filter (EKF), and the multiple external aiding sensors are then processed using the interacting multiple model (IMM) at the individual EKF state level.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1A describes one embodiment of a mathematical model of three gyroscopes according to the principles of the present disclosure.

FIG. 1B describes one embodiment of a mathematical model of three accelerometers according to the principles of the present disclosure.

FIG. 2 describes one embodiment of an integrated INS architecture employing an IMU and an external aided sensor according to the principles of the present disclosure.

DETAILED DESCRIPTION OF THE DISCLOSURE

Figure 3A:
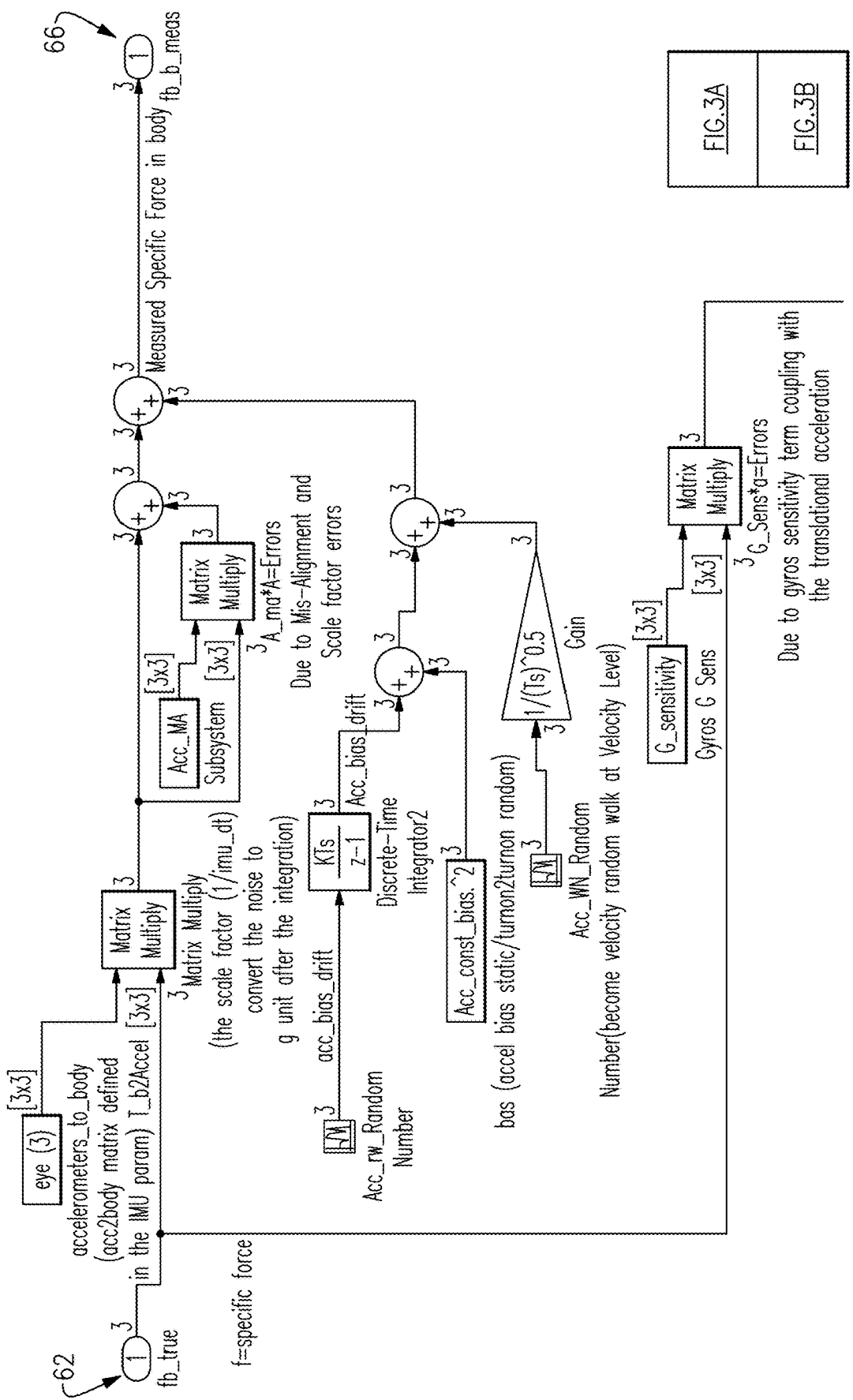
FIG. 3 consists of FIG. 3A and FIG. 3B are a diagram of one embodiment of an integrated INS architecture having an IMU model according to the principles of the present disclosure.

One embodiment of the present disclosure has the ability to compensate for high drift error sources of a MEMS IMU by using a dual mode mixing of different states of the extended Kalman filter (EKF). In certain embodiments, the system of the preset disclosure addresses the overlapping dynamics between a nominal mode vs high dynamic mode (i.e., high angular body rate and high g maneuvering). As a result, the present system offers an improved accuracy INS solution and more robust operation as compared to a conventional INS design approach, which statically addresses only a single mode via a single EKF implementation approach.

There are many potential applications with respect to the high performance INS solution of the present system using a MEMS IMU. This is especially true when any aiding sources that may be used are non-GPS (i.e., GPS Denied INS Solutions). The system of the present disclosure provides precision INS performance with the use of a low cost MEMS IMU as a commercial off the shelf (COTS) inertial sensor. This is quite attractive to a variety of military missions (e.g., small projectiles and missiles), space applications (e.g., nanosatellite INS, small satellites attitude determination systems), and commercial applications. For commercial applications, the use of portable mobile phones and/or shoe-mounted personal tracking devices (e.g., fire fighters) allows for better precision for pinpointing individual locations for safety and navigation.

In one embodiment of the system of the precision inertial navigation system of the present disclosure, a dual mode INS design exhibits an improved performance using a high fidelity 6DOF simulation environment. In certain embodiments, the system provides a 6DOF navigation solution using orthogonal interferometry (OI) sensor measurements as an aiding source. In some cases, the system uses a dual mode mixing of two extended Kalman filter (EKF) models: 15 state and 21 state via an interacting multiple model (IMM) estimation scheme.

One may wonder why not just use a 21 state single EKF and let the EKF take care of everything. It has been shown that if the projectile (for example) is in a small rate and small acceleration operating condition, scale factor (SF) error estimate vectors for both gyros and accelerometers will be negligible. In that example, the single EKF will behave almost as a lower dimension state vector (because the 6 IMU SF errors become almost zero, thus leading to a 15 state EKF. In some cases, if the rate and acceleration magnitudes increase (e.g., high g and high angular rate operating conditions) then the full state vector with 21 elements will be in effect because at that time the SF errors will become dominant (because IMU SF errors are rate and acceleration dependent).

Another reason why mixing is a better choice is that rate and acceleration change, magnitude-wise. They are not a discrete on-off or switch. Rather, they are continuous. There is no clear-cut division of rate or acceleration vectors that allows a discrete modeling of either bias error dependence or SF error dependence. Rather, they are overlapping. As a result, a mixing scheme of both a 15 state and a 21 state offer a better representation of the projectile (for example) going through nominal and high g/rate operating conditions.

OI Aided INS Algorithm Description 21 state Extended Kalman Filter (EKF) Model Description in Navigation (n) frame $$\delta \dot{x} = F \cdot \delta x + G \cdot \delta w$$

$$\delta x = [\delta p \, \delta v \, \delta \varepsilon \, \delta ba \, \delta bg \, \delta sa \, \delta sg]$$

where $\delta p =$: 3×1 position error in n frame (i.e., NED, intended to eliminate a lot of trigonometry function as a function of Latitude and Longitude); $\delta v =$: 3×1 velocity error in n frame (i.e., NED); ($\delta \varepsilon =$: 3×1 attitude error in n frame; $\delta ba =$: 3×1 accelerometers bias errors (transformed to n frame via Cb2n DCM); $\delta bg =$: 3×1 gyroscopes bias errors (transformed to n frame via Cb2n DCM); $\delta sa =$: 3×1 accelerometers scale factor errors; and $\delta sg =$: 3×1 gyros scale factor errors.

$\delta w = [\delta a_{bias} \, \delta g_{bias} \, \delta a_{sfe} \, \delta g_{sfe}]'=$: IMU bias and sf errors vector (12×1), where $\delta a\_bias =$: accelerometers velocity random walk; $\delta g\_bias =$: gyros angular random walk; $\delta a\_sfe =$ accelerometers scale factor errors noise; and $\delta g\_sfe =$ gyros scale factor errors noise; and $Q_{12 \times 12} = E\{\delta w \cdot \delta w'\} = \text{diag}([\sigma^2_{abx} \, \sigma^2_{aby} \sigma^2_{abz} \, \sigma^2_{gbx} \, \sigma^2_{gby} \, \sigma^2_{asfx} \, \sigma^2_{asfy} \, \sigma^2_{asfz} \, \sigma^2_{gsfx} \, \sigma^2_{gsfy} \, \sigma^2_{gsfz}])$.

[F,G] Matrix Description for 21 State System

| Fc = | [O | I | O | O | O | O | O; |
|---|---|---|---|---|---|---|---|
| | O | O | St | Rb2t | O | Rb2t*Da | O; |
| | O | O | O | O | —Rb2t | O | —Rb2t*Dg; |
| | O | O | O | B1 | O | O | O; |
| | O | O | O | O | B2 | O | O; |
| | O | O | O | O | O | O | O; |
| | O | O | O | O | O | O | O]; |

% Noise gain matrix $Gc = [O \, O \, O \, O; Rb2t \, O \, O \, O; O-Rb2t \, O \, O; O \, O \, I \, O; O \, O \, O \, I; O \, O \, O \, O; O \, O \, O \, O]$;

where Rb2t=q2dcm(q); % DCM body to NED frame.
% Transform measured force to force in the navigation coordinate system,
f_t=Rb2t*u(1:3);
Create a skew symmetric matrix of the specific force vector
St=[0−f_t(3) f_t(2); f_t(3) 0−f_t(1); −f_t(2) f_t(1) 0];
% Zero matrix
O=zeros(3);
% Identity matrix
I=eye(3);
% Diagonal matrices with the specific force and angular rate along the diagonals.
Da=diag(u(1:3)); % Compensated specific force (after removing bias and scale factor errors)
Dg=diag(u(4:6)); % Compensated angular rate (after removing bias and scale factor errors)
% Correlation constant for accelerometer and gyro biases
B1=−1/simdata.acc_bias_instability_time_constant_filter*eye(3);

B2=−1/simdata.gyro_bias_instability_time_constant_filter*eye(3);

[F,G]Matrix Description for 15 State System (a Reduction from the 21 State EKF)

| Fc = [ | O | I | O | O | O; |
|---|---|---|---|---|---|
| | O | O | St | Rb2t | O; |
| | O | O | O | O | —Rb2t; |
| | O | O | O | B1 | O; |
| | O | O | O | O | B2]; |

% Noise gain matrix $G = [O \, O \, O \, O; Rb2t \, O \, O \, O; O-Rb2t \, O \, O; O \, O \, I \, O; O \, O \, O \, I]$;

where Rb2t=q2dcm(q); % DCM body to NED frame
% Transform measured force to force in the navigation coordinate system, f_t=Rb2t*u(1:3);

% Create a skew symmetric matrix of the specific force vector
St=[0−f_t(3) f_t(2); f_t(3) 0−f_t(1); −f_t(2) f_t(1) 0];
% Zero matrix
O=zeros(3);
% Identity matrix
I=eye(3);
Measurement Matrix & Measurement Update
Position and Velocity measurements are available from GPS receiver
$Y_{oi} = [P_{OI}; V_{OI}]$; % in NED (6×1 vector)
Measurement Matrix H=[eye(3) zeros(3,18) zeros(3) eye(3) zeros(3,15)];
For an OI Sensor Measurement Covariance Matrix, R $$R_{6 \times 6} = E\{\delta v \cdot \delta v'\} = \text{diag}([\sigma^2_{pn} \sigma^2_{pe} \sigma^2_{pd} \sigma^2_{vn} \sigma^2_{ve} \sigma^2_{vd}])$$

Measurement Residual Vector
z_residual=$Y_{OI}$−$Y_{INS}$
EKF Error State Update
$\delta x$=EKF_GAIN*z_residual (21×1) EKF state error correction $$\delta x = [\delta p \, \delta v \, \delta \varepsilon \, \delta ba \, \delta bg \, \delta sa \, \delta sg |]$$

where, the first three terms above relate to platform state correction and the last four terms above relate to IMU data correction.

One aspect of the present disclosure is a high performance INS algorithm, hosted by a unique mixing architecture, comprising two Extended Kalman Filters (EKFs): a 15 state EKF and a 21 state EKF. The 15 state EKF addresses applications which may exhibit low angular rate and low g (translational acceleration) and as such only IMU bias errors (i.e., 3-D gyroscope bias errors and 3-D accelerometer bias errors) are required to be estimated in conjunction with a platform's 6DOF error state vector (i.e., 3-D position errors, 3-D velocity errors, and 3-D attitude errors). The 21 state EKF, on the other hand, addresses applications on platforms exhibiting a high angular rate vector and a high (g) translational acceleration vector (also known as high dynamic operating conditions). In high dynamic operating conditions, the MEMS IMU scale factor errors (SFEs) become a significant error source which contaminate the output of the MEMS IMU (i.e., gyroscope sfe_errors=g_sfe*angular rate and accelerometer sfe_errors=a_sfe*acceleration_vector). FIG. 1A and FIG. 1B show the mathematical expression on the effects of SFEs to IMU sensor output according to one embodiment of the present disclosure.

In one embodiment of the INS system of the present disclosure, there is no clear cut boundary separating a high dynamic mode (i.e., high angular rate and high g operating condition) and a medium or low dynamic mode (i.e., low/medium angular rate and translational acceleration). Therefore, choosing one EKF model over another EKF model under a single filter implementation fashion to address a mission exhibiting a wide dynamic range of operation is not optimal. This present disclosure offers a better INS filtering architecture by addressing the shortcomings of a single INS filter design by dynamically computing in real-time what the percentage of contribution of each individual filters should be. Again, three gyroscopes' scale factor errors and three accelerometers' scale factor errors are added in and estimated as part of the 15 state EKF. With SFEs added in to the former 15 state EKF, this subsequently creates the 21 state EKF model (i.e., former 15 state+3 gyroscopes' SFE+3 accelerometers' SFE) to address a platform's potential high dynamic operating condition.

Referring to FIG. 1A one embodiment of a mathematical model of three gyroscopes according to the principles of the present disclosure is shown. More particularly, the model addresses part of a MEMS IMU sensor consisting of three gyros and three accelerometers whose functionality is to measure the angular rate vector (w) of the applied platform. The measured angular rate vector is contaminated or corrupted by the gyroscopes' multiple noise sources. Those gyroscopes' noise sources include (i) bias errors; (ii) angular random walk; (iii) rate random walk; (iv) scale factor errors; and (v) misalignment errors, for example. There, w is the true rate 2, b is a gyroscope bias (degree/hr) 4, and $\eta_v$ represents Angular Random Walk (ARW) 6 in degrees/hr^0.5. Rate Random Walk (RRW) 8 in degrees/hr^1.5 is represented by $\eta_u$. Independent zero-mean Gaussian white noise processes are denoted by 10. Upper misalignment errors 12 and lower misalignment errors 14 are also shown. Here, for this scope they are defined as zero. The scale factor errors (sfe) 16 are shown on the diagonal.

Referring to FIG. 1B, one embodiment of a mathematical model of three accelerometers according to the principles of the present disclosure is shown. More specifically, the three accelerometers' functionality is to measure the translational acceleration (or specific force) vector (f) of the applied platform. The f variable in FIG. 1B is the truth specific force 20 (in acceleration unit m/s^2) of the applied platform and the specific force f vector (in x, y, z) is measured by three accelerometers in those three axes, respectively. Similar to the gyroscope measurement situation in FIG. 1A, the measured specific force vector is contaminated or corrupted by the accelerometers' multiple noise sources. Those accelerometers' noise sources include (i) bias errors; (ii) velocity random walk; (iii) scale factor errors; and (iv) misalignment errors, for example. More specifically, the acceleration output, or measured acceleration 18 comprises, in part, the true specific force 20, the accelerometer bias 22 as measured in m/s^2 or g and Velocity Random Walk (VRW) 24 as measured in m/s^0.5. Acceleration Random Walk (ARW) 26 is measured in m/s^1.5 and the independent zero-mean Gaussian white noise processes 28 are similar to those shown in FIG. 1A, 10). Additionally, the bias errors and scale errors 30 are accounted for in the EKF as shown, for example, in FIG. 3 by splitting them in to two EKFs (e.g., a 15 state and a 21 state) according to the principles of the present disclosure. Only bias errors and scale factor errors were used in one embodiment as other error terms (e.g., misalignment and g sensitivity) were considered to be negligible.

Referring to FIG. 2, one embodiment of an integrated INS architecture employing an IMU and an external aided sensor according to the principles of the present disclosure is shown. More specifically, an integrated INS architecture which employs an IMU and an external aided e.g., an Orthogonal Interferometry (OI) sensor is shown. The OI sensor serves as the equivalence of a GPS receiver in the context of GPS/INS system. This may be particularly useful in a GPS denied environment. FIG. 2 also demonstrates a detailed description of the 15 state EKF and 21 state EKF according to the principles of the present disclosure.

Still referring to FIG. 2, an IMU 40 driven by truth data (and collected via gyroscopes and accelerometers, as discussed above) is corrected 42 and that output is then fed into INS mechanization equations 44 which is later fed to a guidance and control system 46 for a platform. The IMU 40, in this embodiment is aided by an aiding sensor 48. In this case the aiding sensor is an OI sensor capturing OI measurements similar to GPS measurements in a loosely coupled GPS/INS system. A module configured to perform the EKF mixing 50 provides for a mixing of a 15 state and a 21 state in one embodiment according to the principles of the present disclosure. The mixing module 50 feeds platform error estimate vectors 52 into the INS mechanization equations and IMU errors estimate vectors 54 into the IMU data correction module 42 as well as receives EKF residuals 56 form an aiding sensor's 48 and the INS system 58 configured to provide respective predicted position and velocity data 60. In this embodiment, the 15 state comprises three position, three velocity, three attitudes, three accelerometer bias, and three gyroscope bias terms; and the 21 state comprises three position, three velocity, three attitude, three accelerometer bias, three gyroscope bias, three accelerometer scale factor error and three gyroscope scale factor error terms.

Figure 3B:
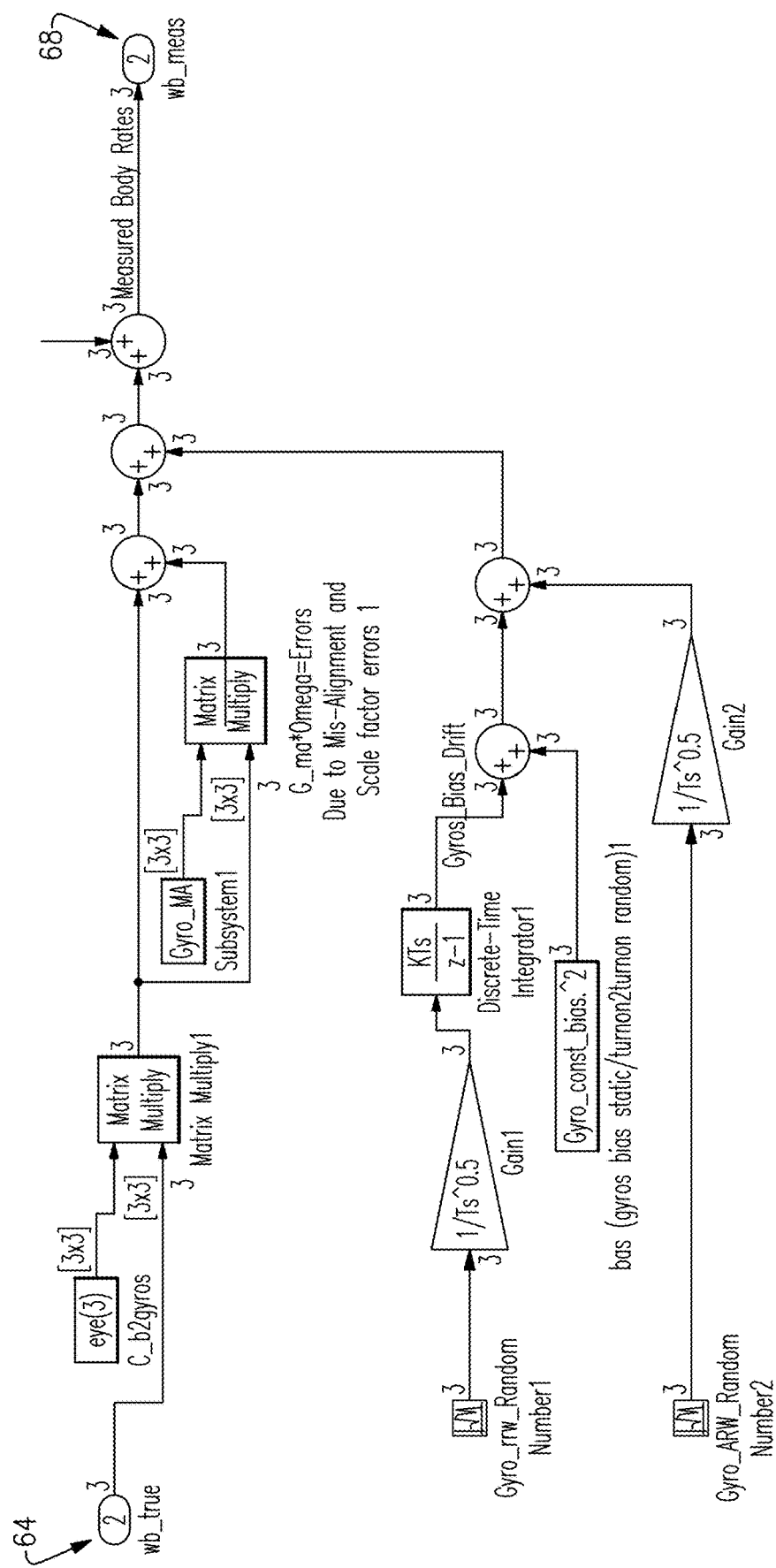

Referring to FIG. 3A and FIG. 3B, a diagram of one embodiment of an integrated INS architecture having an IMU model according to the principles of the present disclosure is shown. More specifically, one embodiment of the IMU model has truth specific force 62 (See, e.g., FIG. 3A) and truth angular body rate 64 (See, e.g., FIG. 3B) inputs generated by the applied platform. These two truth vectors are then contaminated by multiple electronic noise sources described in more detail in FIG. 1A and FIG. 1B to produce a high fidelity MEMS IMU output (i.e., measured specific force 66 and measured angular rate 68 vectors, in FIG. 3A and FIG. 3B, respectively). In certain embodiments, the noise sources include (i) bias errors; (ii) random walk errors; (iii) scale factor errors; and (iv) misalignment errors.

Figure 4:
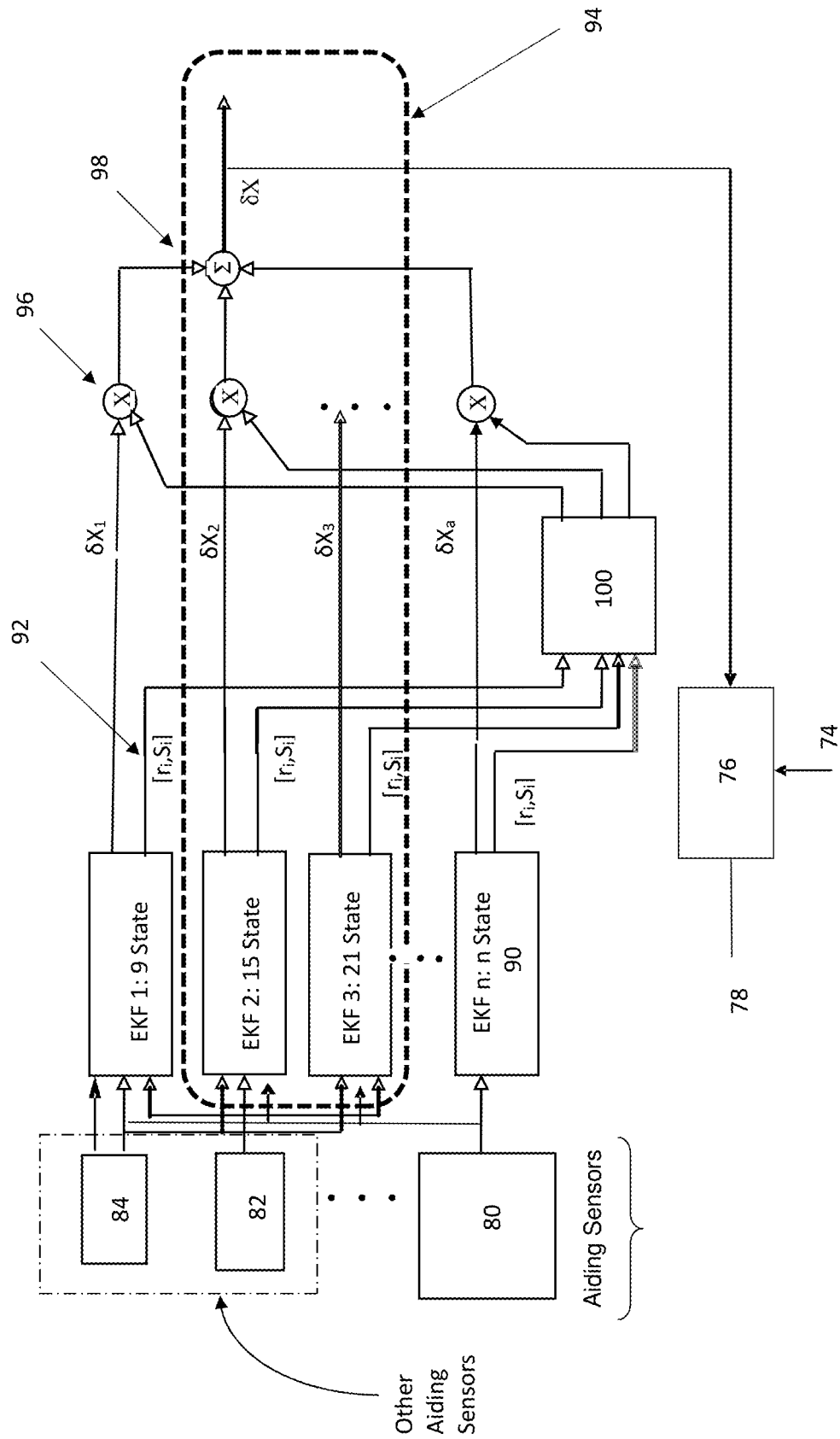
FIG. 4 describes one embodiment of a generalized multiple model estimation scheme with flexibility to provide multiple external aiding sensors according to the principles of the present disclosure.

Referring to FIG. 4 a generalized multiple model estimation scheme with flexibility to provide multiple external aiding sensors according to the principles of the present disclosure is shown. More specifically, raw IMU data 74 is input and IMU data correction 76 occurs according to a compensate rate for EKF propagation 78 according to the principles of the present disclosure. In one embodiment, aiding sensors 80 are shown. In one embodiment an aiding sensor 80 is a GPS. In some cases, the aiding sensor is an OI-enabled RF sensor. In certain embodiments there are a plurality of aiding sensors 80, 82, 84 including, but not limited, to gyroscopes, accelerometers, and altimeters. Each aiding sensor has a corresponding EKF and state 90. In some cases, the EKF for an aiding sensor is a 9 state, a 15 state, a 21 state, or the like. In one embodiment of the present disclosure, a dual mode mixing 94 of a 15 state and a 21 state EKF was used. It is understood that other modes can be included, if required. Filter i, residual r and output covariance S=[ri, Si]. In some cases dimension equalization 96 to the largest state vector (after weighting) is calculated. In a certain embodiment, a conditional model weighted probability 100 is used. In some cases, multiple mode adaptive estimation (MMAE) uses a Bayesian Estimate 98. In one embodiment, the mixing used the IMM algorithm, as discussed in more detail below.

Figure 5B:
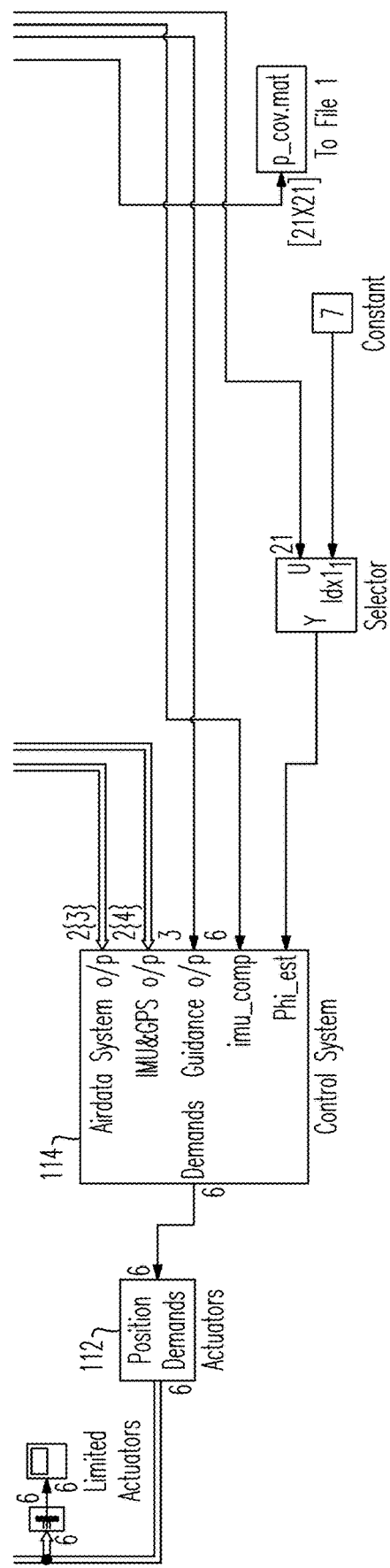
FIG. 5 consists of FIG. 5A and FIG. 5B together describe one embodiment of a high performance INS design according to the principles of the present disclosure.

Referring to FIG. 5A and FIG. 5B, one embodiment of a high performance INS design according to the principles of the present disclosure is shown. More specifically, one embodiment of the high performance INS design developed in this present disclosure was developed with a 6DOF simulation platform 110 (e.g., an earth to orbit vehicle) as an onboard INS system to provide the platform's state estimate vector for guidance and control loop closure. The platform has a control system 114 and various actuators 112 for steering and operating the platform. A series of sensor 116 comprising scopes, visualization systems (e.g., VR and flight instruments), IMU, GPS, radar altimeters, and other air data systems may be present. The IMU and aiding sensor data are processed 118 according to the principles of the present disclosure to remove errors and provide more accurate state vectors for use in guidance and control. In this embodiment, one aiding sensor is an OI enabled RF system as part of an OI aided INS 120. The mixing of a 15 state/a 21 state EKF/INS process can be used for a number of applications. In some cases, the dual mode mixing system of the present disclosure is used to guide munitions for precision targeting at a low cost.

Figure 6:
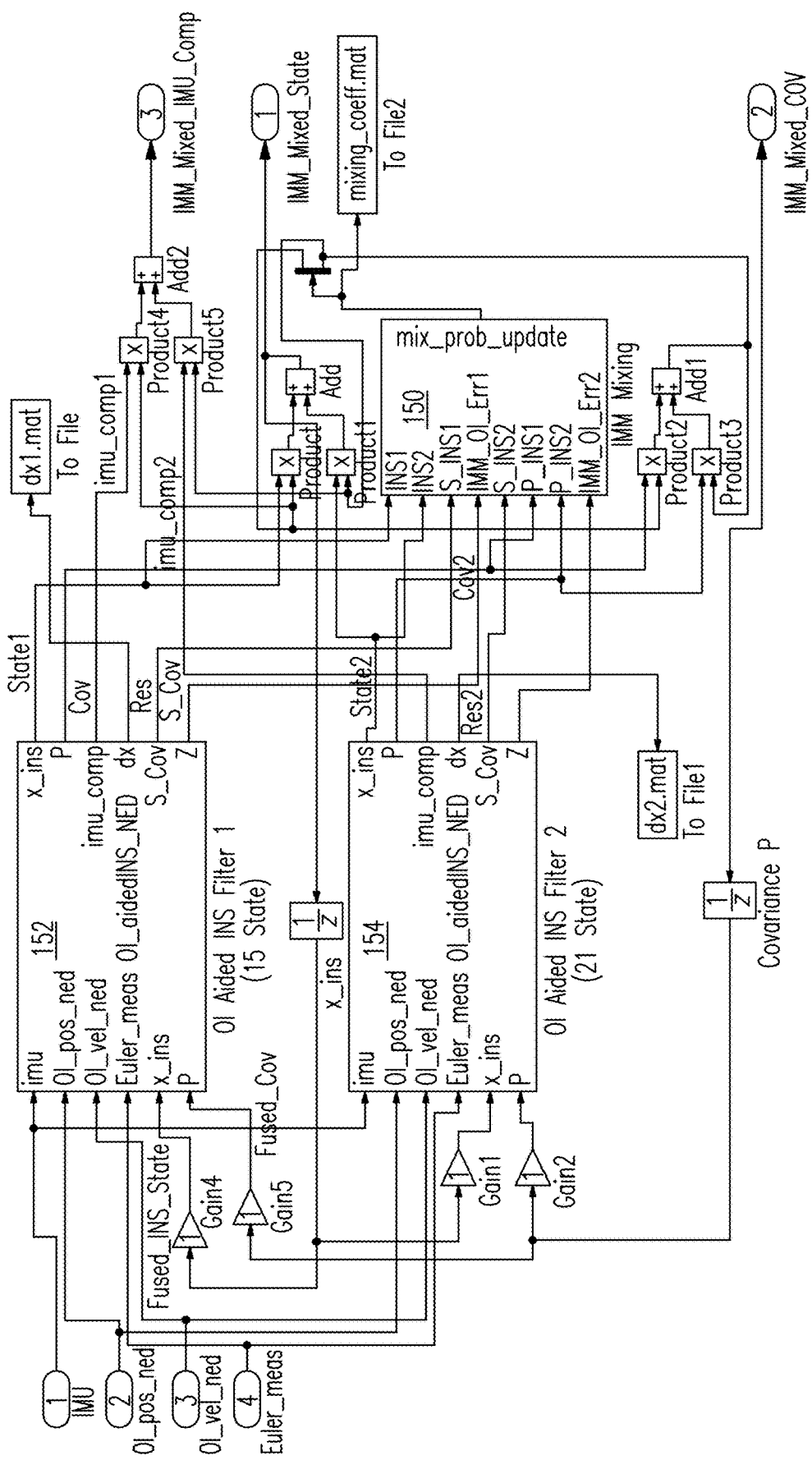
FIG. 6 describes one embodiment of a dual mode INS filtering system according to the principles of the present disclosure implemented in Simulink.

Referring to FIG. 6, one embodiment of a dual mode INS filtering system according to the principles of the present disclosure implemented in Simulink is shown. More specifically, the figure illustrates how individual filter's states are mixed using the interacting multiple model estimation scheme 150 at the top layer. In this embodiment, a 15 state 152 and a 21 state 154 EKF are used.

Figure 7:
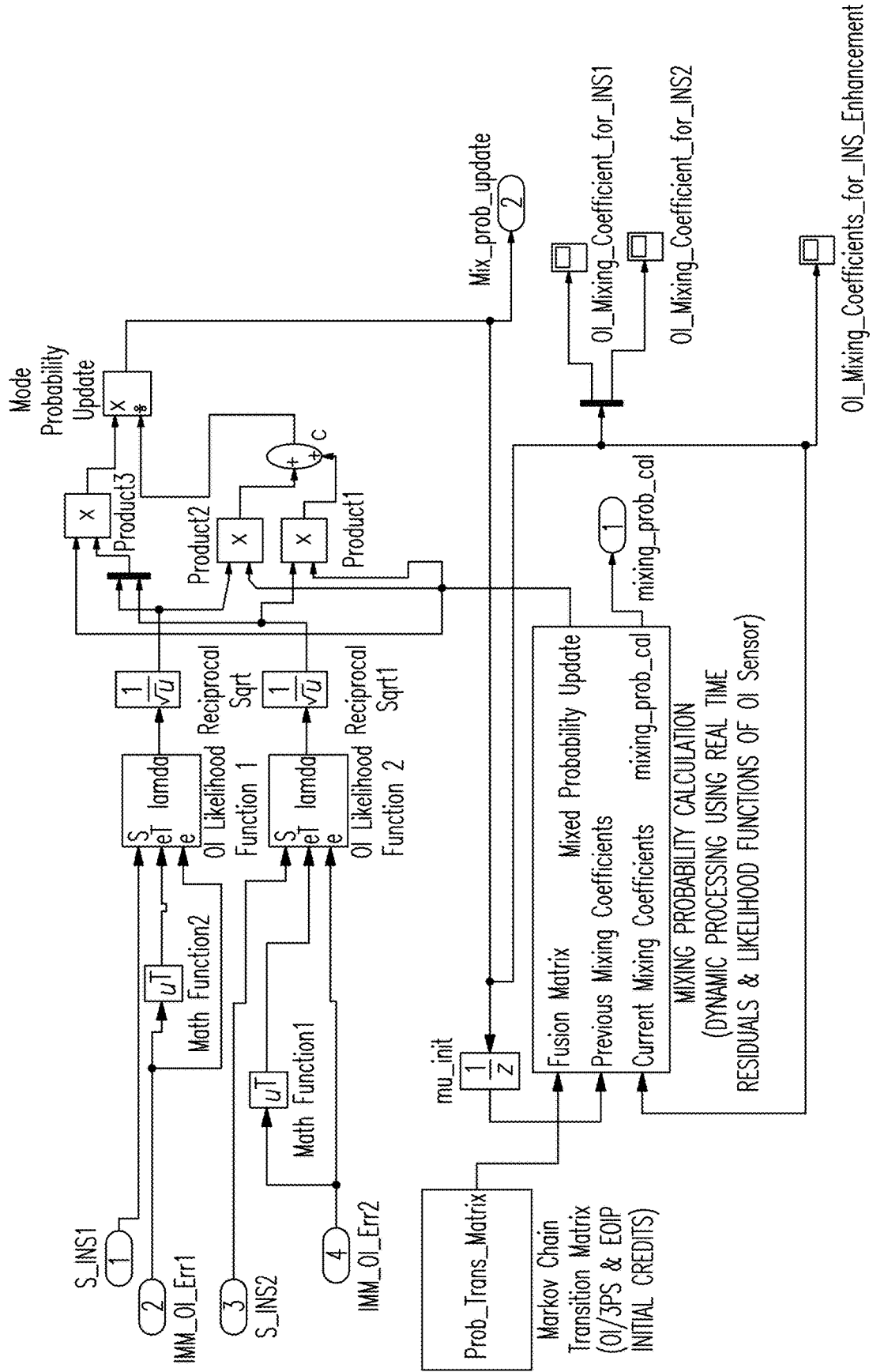
FIG. 7 describes one embodiment of a processing for calculating mixing coefficients in real-time using residual errors according to the principles of the present disclosure.

Referring to FIG. 7, one embodiment of a processing for calculating mixing coefficients in real-time using residual errors according to the principles of the present disclosure is shown. More specifically, the processing scheme at the inner layer level is utilized by calculating the mixing coefficients in real time by using the residual errors. See, e.g., below for equation (9) in the form of likelihood function, as shown in equation (4), for each individual filter as shown in the embodiment using the IMM mixing scheme captured in equations (1) to (16), below.

Model-Conditional Reinitialization (for j=1, . . . , r)
Calculation of Predicted Mode Probability $$\hat{\mu}_j(n+1\mid n) = :P\{m_j(n+1)\mid Z^n\} = \sum_{i=1}^{r} p_{ij}\mu_i(n) \quad (1)$$

Calculation of Mixing Probabilities $$\mu_{i|j}(n) = :P\{m_i(n)\mid m_j(n+1), Z^n\} = p_{ij}\mu_i(n)/\hat{\mu}_j(n+1\mid n) \quad (2)$$

where $$\mu_i(n) = \frac{\hat{\mu}_i(n\mid n-1)L_i(n)}{\sum_i \hat{\mu}_i(n\mid n-1)L_i(n)} \quad (3)$$

and the likelihood function, Lj(n), is computed as follows, $$L_j(n) = \frac{1}{\sqrt{(2\pi)|S_j(n)|}} e^{[\frac{1}{2}v_j(n)'S_j^{-1}(n)v_j(n)]} \quad (4)$$

Calculation of Mixing Estimate $$\hat{x}_j^0(n\mid n) = \sum_{i=1}^{r} \hat{x}_i(n\mid n)\mu_{i|j}(n) \quad (5)$$

Calculation of Mixing Covariance $$P_j^0(n\mid n) = \quad (6)$$

$$\sum_{i=1}^{r} \mu_{i|j}(n\mid n) \cdot \{P_i(n\mid n) + [\hat{x}_i(n\mid n) - \hat{x}_j^0(n\mid n)] \cdot [\hat{x}_i(n\mid n) - \hat{x}_j^0(n\mid n)]'\}$$

Prediction & Update Calculation for Model-Conditional Filtering
Prediction Stage:

$$\hat{x}_j(n+1\mid n) = \Phi \cdot \hat{x}_j^0(n\mid n) \quad (7)$$

$$P_j(n+1\mid n) = \Phi(n) \cdot P_j(n\mid n) \cdot \Phi(n) + Q(n) \quad (8)$$

Measurement Residual $$v_j = z(n+1) - H_j(n+1)\hat{x}_j(n+1\mid n) \quad (9)$$

Residual or Output Covariance $$S_j = H(n+1)P_j(n+1\mid n)H(n+1)' + R(n+1) \quad (10)$$

Filter Gain $$K_j(n+1) = P_j(n+1\mid n)H \cdot S_j(n+1)^{-1} \quad (11)$$

Update Stage $$\hat{x}_j(n+1\mid n+1) = \hat{x}_j(n+1\mid n) + K_j(n+1) \cdot v_j \quad (12)$$

$$P_j(n+1\mid n+1) = P_j(n+1\mid n) - K_j(n+1)S_j(n+1)K_j(n+1)' \quad (13)$$

Combination of Estimates
Overall IMM Estimate with j=1 to 2 (for 15 state EKF and 21 state EKF)

$$\hat{x}(n+1\mid n+1) = \sum_j \hat{x}_j(n+1\mid n+1)\mu_j(n+1) \quad (14)$$

Overall IMM Covariance $$P(n+1\mid n+1) = \Sigma[Pj(n+1\mid n+1) + \lambda(n+1)\lambda(n+1)']\mu_j(n+1) \quad (15)$$

Where $$\lambda(n+1) = [\hat{x}(n+1\mid n+1) - \hat{x}_j(n+1\mid n+1)] \quad (16)$$

Figure 8:
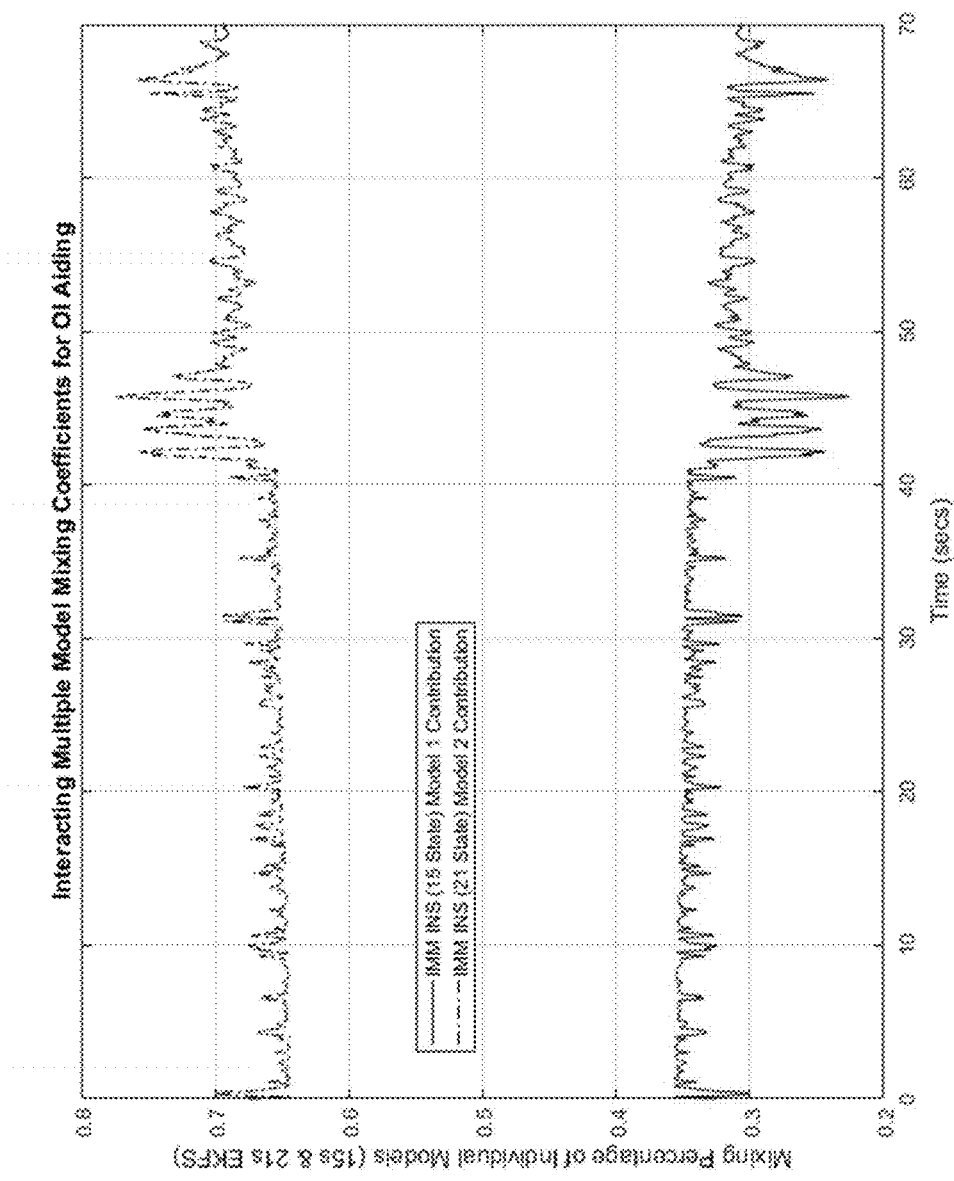
FIG. 8 describes one embodiment of dual mode INS mixing coefficients according to the principles of the present disclosure.

Referring to FIG. 8, one embodiment of dual mode INS mixing coefficients according to the principles of the present disclosure is shown. More specifically, the profiles of the dual mode INS mixing coefficients (captured in equation (3)) computed in real-time for the design developed in this disclosure and applied to an earth to orbit vehicle for a reentry mission. As can be seen in the figure, the 21 state model contributes 65% or more throughout the mission. It is understood that the components mix to total 100% (here there are two components—one contributing about 65% and the other about 35%).

In one embodiment, a dual mode INS design architecture addresses both nominal and high dynamic operating conditions of a projectile, or the like. The dual mode INS algorithm offers a robust solution by addressing the continuous transition from nominal operating condition to high operating conditions. In one embodiment, the mixing coefficients are computed using the well known Interacting Multiple Model (IMM) estimation scheme rather than straight Multiple Model Adaptive Estimation (MMAE). In some cases, OI sensor measurements are modeled at a high fidelity.

Certain embodiments of the dual mode INS scheme offer a better compensation scheme for MEMS IMUs, by taking care of both bias errors and scale factor errors. In one embodiment, the 15 state EKF is intended for bias errors estimation and removal, while the 21 state EKF is intended for both bias errors and scale factor errors estimation and removal. Mixing via IMM captures the actual continuous dynamic mode transition from nominal to high dynamic operating conditions, thus effectively estimating and removing the MEMS IMU high bias drift errors and scale factor errors. As a result, the overall INS solution provides a much more robust and high precision solution for a variety of projectiles and missiles.

Figure 9:
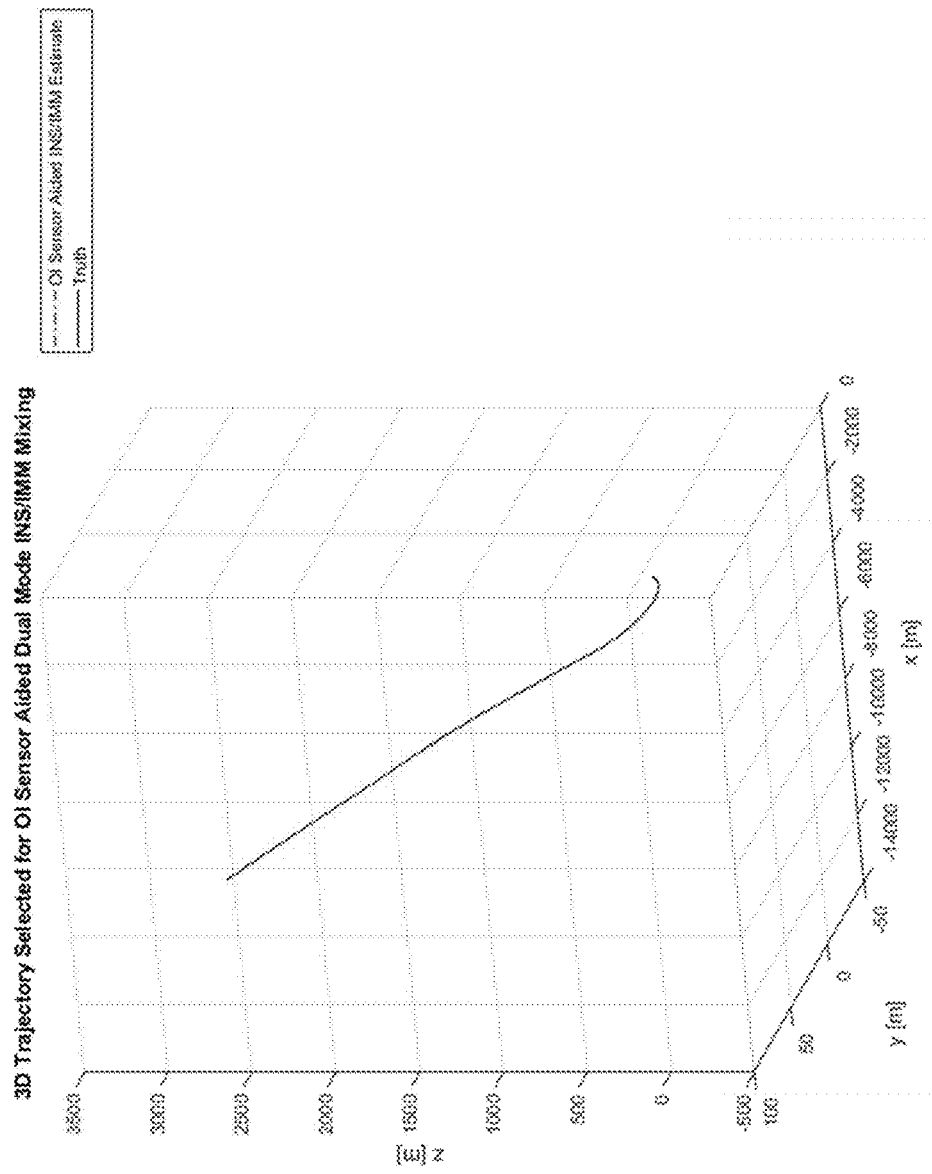
FIG. 9 describes one embodiment of a 3-D reentry profile, truth vs reconstructed trajectory, using a MEMS IMU and an OI-enabled RF sensor as an IMU aiding source according to the principles of the present disclosure.

Referring to FIG. 9, one embodiment of a 3D reentry profile, truth vs reconstructed trajectory, of an earth to orbit vehicle using a MEMS IMU and an OI sensor as an IMU aiding source according to the principles of the present disclosure is shown. More specifically, truth data is plotted along with the IMM estimate using a MEMS IMU with an OI enabled RF aiding sensor. The plots are overlaid due to the precision provided by the system of the present disclosure. Not shown here, plots of the INS position estimates, velocity estimates, and attitude estimates against truth data were also overlaid in the various directions.

Figure 10:
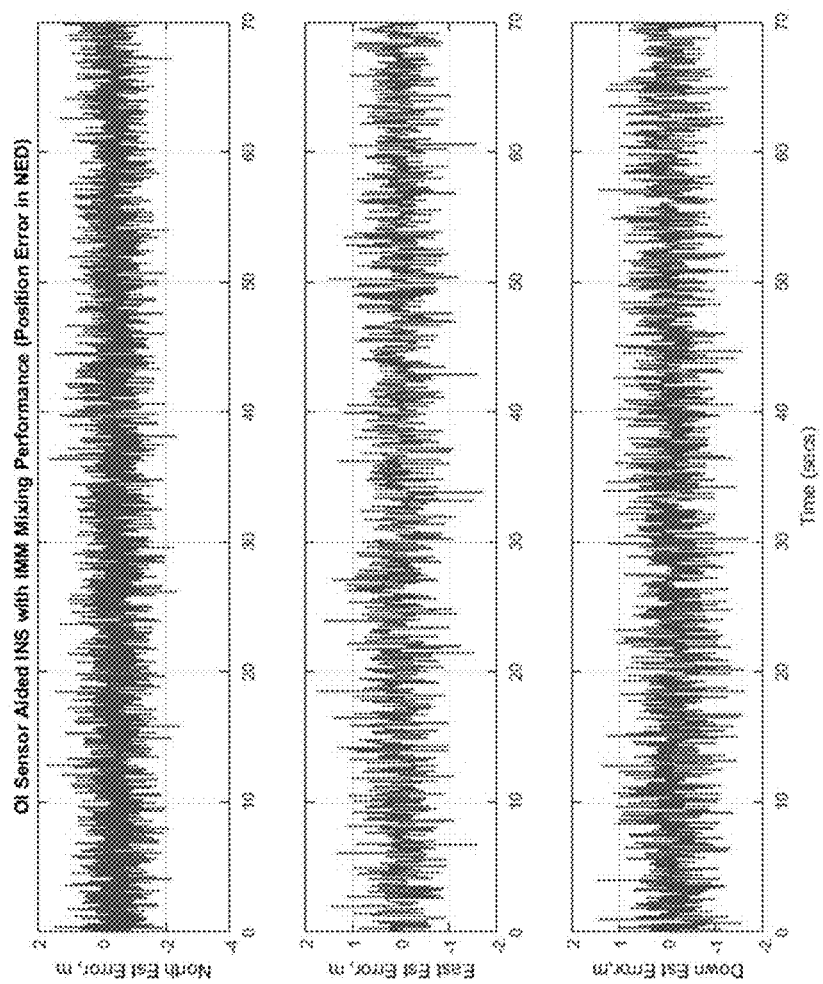
FIG. 10 shows how accurate the position estimation is using an OI-enabled RF sensor aided INS with a dual mode mixing scheme according to the principles of the present disclosure. The 3-D position estimation errors as shown therein are less than 1 m (peak to peak 3 sigma value)s

Referring to FIG. 10, how accurate the position estimation is using an OI-enabled RF sensor aided INS with a dual mode mixing scheme according to the principles of the present disclosure is shown. More specifically, the 3-D position estimation errors as shown therein as less than 1 m (peak to peak 3σ value).

Figure 11:
FIG. 11 is a flow chart of one embodiment of a method according to the principles of the present disclosure.

Referring to FIG. 11, a flow chart of one embodiment of a method according to the principles of the present disclosure is shown. More specifically, an inertial measuring unit is provided, wherein the inertial measuring unit provides a platform's specific force and angular rate measurements 200. One or more external aiding sensors are provided, wherein the one or more external aiding sensors provide information to aid in an estimate of the error sources at the inertial measuring unit measurement level for a subsequent calibration and removal of the errors 202. A state and a covariance are calculated for a plurality of extended Kalman filter (EKF) models, wherein a first EKF model is a fifteen state and a second EKF model is a twenty one state model 204. The state and the covariance for the first and the second EKF models, respectively are updated over time 206. High bias drift errors and scale factor errors are estimated and removed from the inertial measuring unit data 208. An INS solution is computed using the compensated IMU data from the previous step 210 and the a robust and high precision navigation solution is then provided to a guidance and control system for a variety of aerospace platforms and/or projectiles 212.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An inertial navigation system, comprising:
an inertial measurement unit (IMU) wherein the inertial measuring unit provides a platform's specific force and angular rate measurements;
one or more sensors configured to provide information to aid in an estimate of the error sources for a subsequent calibration and removal of the errors at the inertial measuring unit measurement level; and
a processor, the processor configured to:
calculate a state and a covariance for a plurality of Extended Kalman Filter (EKF) models, wherein a first EKF model is a fifteen state EKF and a second EKF model is a twenty one state EKF;
update, over time, the state and the covariance for the first and the second EKF models, respectively;
estimate and remove high bias drift errors and scale factor errors from the inertial measuring unit data; and
provide a solution having an error of less than 30 feet for a variety of platforms.

2. The system according to claim 1, wherein mixing is done in real time using an interacting multiple model (IMM) estimation and processing scheme.

3. The system according to claim 2, wherein mixing is based on mixing coefficients calculated using an interacting multiple model mixing scheme.

4. The system according to claim 3, wherein the interacting multiple model mixing scheme captures the continuous dynamic mode transition from a nominal to a high dynamic operating condition.

5. The system according to claim 1, wherein one of the one or more external aiding sensors is a radio frequency orthogonal interferometry enabled sensor.

6. The system according to claim 1, wherein the inertial measuring unit and the one or more external aiding sensors are co-located on a vehicle or a projectile.

7. The system according to claim 1, wherein the fifteen state Extended Kalman Filter is used for a low dynamic mode operating condition using bias errors for the inertial measuring unit and platform state error estimations for position, velocity, and attitude.

8. The system according to claim 1, wherein the twenty one state Extended Kalman Filter is used for a high dynamic mode operating condition using bias errors and scale factor errors for the inertial measuring unit and platform state error estimations for position, velocity, and attitude.

9. The system according to claim 1, wherein multiple external aiding sensor data is mixed using a multiple model estimation scheme wherein each external aiding sensor can be assigned to each individual Extended Kalman Filter (EKF), and the multiple external aiding sensors are then processed using an interacting multiple model (IMM) at the individual EKF state level.

10. A method of producing a high performance inertial navigation solution using a MEMS based inertial measuring unit, comprising:
providing an inertial measuring unit, wherein the inertial measuring unit provides a platform's specific force and angular rate measurements;
providing one or more external aiding sensors, wherein the one or more external aiding sensors provide information to aid in an estimate of the error sources for a subsequent calibration and removal of the errors at the inertial measuring unit measurement level;
calculating a state and a covariance for a plurality of Extended Kalman Filter (EKF) models, wherein a first EKF model is a fifteen state EKF and a second EKF model is a twenty one state EKF;
updating over time the state and the covariance for the first and the second EKF models, respectively; and
estimating and removing high bias drift errors and scale factor errors from the inertial measuring unit data;
thereby providing a solution having an error of less than 30 feet for a variety of aerospace platforms and/or projectiles.

11. The method of a dual mode high performance inertial navigation solution using a MEMS based inertial measuring unit according to claim 10, wherein mixing is done in real time using an interacting multiple model (IMM) estimation and processing scheme.

12. The method of a dual mode high performance inertial navigation solution using a MEMS based inertial measuring unit according to claim 11, wherein mixing is based on mixing coefficients calculated using an interacting multiple model mixing scheme.

13. The method of a dual mode high performance inertial navigation solution using a MEMS based inertial measuring unit according to claim 12, wherein the interacting multiple model mixing scheme captures the continuous dynamic mode transition from a nominal to a high dynamic operating condition.

14. The method of a dual mode high performance inertial navigation solution using a MEMS based inertial measuring unit according to claim 10, wherein one of the one or more external aiding sensors is a radio frequency orthogonal interferometry enabled sensor.

15. The method of a dual mode high performance inertial navigation solution using a MEMS based inertial measuring unit according to claim 10, wherein the inertial measuring unit and the one or more external aiding sensors are co-located on a vehicle or a projectile.

16. The method of a dual mode high performance inertial navigation solution using a MEMS based inertial measuring unit according to claim 10, wherein the fifteen state Extended Kalman Filter is used for a low dynamic mode operating condition using bias errors for the inertial measuring unit and platform state error estimations for position, velocity, and attitude.

17. The method of a dual mode high performance inertial navigation solution using a MEMS based inertial measuring unit according to claim 10, wherein the twenty one state Extended Kalman Filter is used for a high dynamic mode operating condition using bias errors and scale factor errors for the inertial measuring unit and platform state error estimations for position, velocity, and attitude.

18. The method of a dual mode high performance inertial navigation solution using a MEMS based inertial measuring unit according to claim 10, wherein multiple external aiding sensor data is mixed using a multiple model estimation scheme wherein each external aiding sensor can be assigned to each individual Extended Kalman Filter (EKF), and the multiple external aiding sensors are then processed using an interacting multiple model (IMM) at the individual EKF state level.

* * * * *